July 12, 1938.     C. W. SINCLAIR     2,123,614
BRAKE DRUM
Filed June 8, 1936

INVENTOR
CHARLES W. SINCLAIR
BY
ATTORNEYS

Patented July 12, 1938

2,123,614

UNITED STATES PATENT OFFICE 2,123,614

BRAKE DRUM

Charles W. Sinclair, Detroit, Mich., assignor to Kelsey-Hayes Wheel Company, Detroit, Mich., a corporation of Delaware Application June 8, 1936, Serial No. 84,201

4 Claims. (Cl. 188—218)

The present invention relates to composite brake drums. More particularly, it pertains to cast drums, and its principal object is to cast the web and brake engaging flange thereof separately, the web and flange further being cast about a resilient connecting ring having its peripheral edge portions integrated to the web and flange respectively.

One of the objects of the invention is to provide a brake drum in which the web or hub portion and the brake flange portion of the drum are separately cast, either of different metals or of the same metal, and in which the said portions are movable relatively to each other. They may be cast at separate times or simultaneously, if desired.

Another object of the invention is to so connect the web or hub portion of the drum to the brake flange portion that contraction or expansion of the flange portion with respect to the web portion is permitted.

Other objects of the invention will be apparent from the following description, taken in connection with the accompanying drawing in which Fig. 1 is a partial section of a brake drum embodying the invention;

Figure 1:
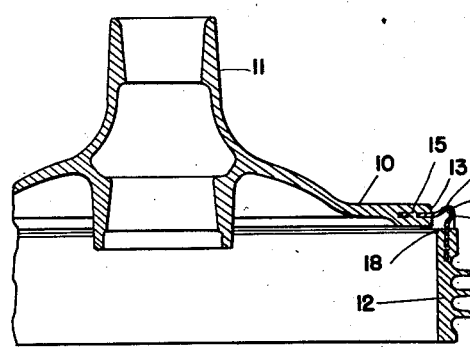
Figure 3:
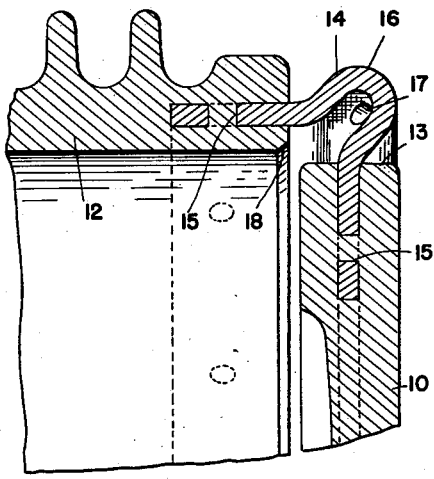
Fig. 3 is an enlarged fragmentary section showing the manner in which the connecting ring is integrated to the web and brake flange.
Figure 2:
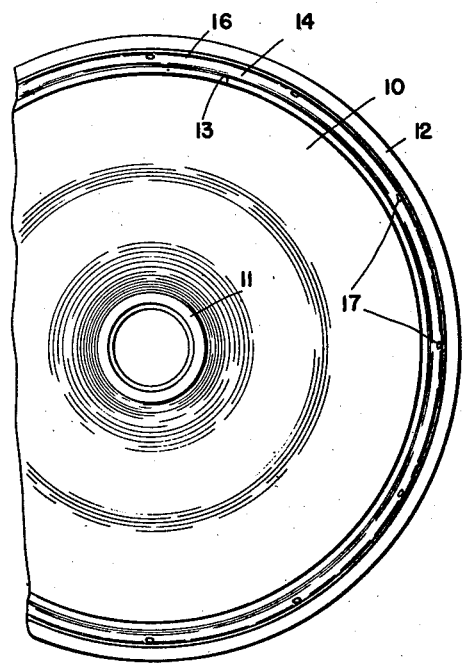
Fig. 2 is a partial elevation of the brake drum shown in Fig. 1.

In the drawing there is shown a brake drum in which the web 10 thereof is integral with the wheel hub 11, but it is obvious that the hub and web may be cast separately and held together by suitable securing means. The brake flange portion 12 of the drum is spaced radially and axially from the peripheral edge 13 of the web sufficiently to permit relative movement of these portions of the brake drum. The means for connecting the web to the brake flange comprises an annular connector 14, preferably sheet metal, substantially L-shaped in section and having a plurality of circumferentially spaced openings 15 in the flanges thereof adjacent the edges of the flanges. The connector ring is preferably bent to form a circumferential outwardly bulged or channel-shaped portion 16 at the junction of its flanges as shown in the drawing, this bulge constituting a resilient or yielding portion in the ring. A plurality of spaced openings 17 in the bulge permit dust and other matter to be thrown from the interior of the drum, as well as providing circulation of air for ventilating purposes. These openings also provide for greater resiliency of the ring at the bulge. The lower and inner corner of the brake flange may be chamfered as at 18 to facilitate flow of air or dust towards and through the openings 17.

It will be seen that the web and brake flange are cast around the peripheral edges of the ring 14, the metal flowing through openings 15, thus forming an integral bond between the ring and the web and flange of the drum respectively. At the same time the yielding portion of the ring permits the brake flange to expand or contract radially with respect to the web without bell-mouthing. The brake flange and web may be cast from the same or from different metals, and they may be cast on the ring simultaneously or at different times.

Figure 4:
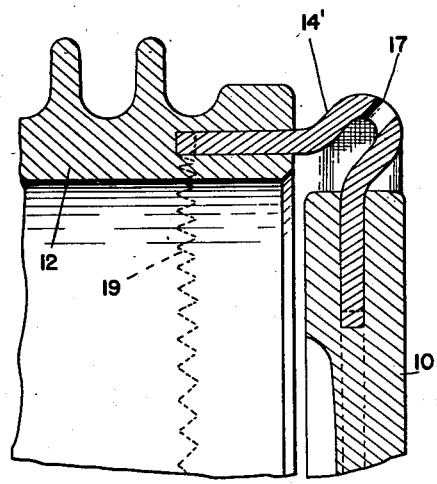
Fig. 4 is an enlarged fragmentary section of a drum showing a modification of the connecting ring.

In the modification shown in Fig. 4, the edges of the ring 14' are serrated or formed with an irregular outline, as shown at 19, to provide the necessary bond and prevent angular displacement between the ring and other portions of the drum.

From the foregoing description it will be apparent that the brake drum is easy of manufacture, that it provides for relative movement of the brake flange with respect to the web of the drum, and that if desired the web and flange may be cast from separate metals.

What I claim as my invention is:

1. A brake drum comprising a cast web portion, a cast brake flange portion, and a sheet metal ring forming a yieldable connection between said portions and embedded therein.

2. A brake drum comprising a cast web portion, a cast brake engaging portion spaced therefrom, and a ring connecting said portions, said web portion being cast about one peripheral edge of said ring and said brake flange portion being cast about the opposite peripheral edge of the ring.

3. A brake drum comprising an annular member substantially L-shaped in section, a web portion cast about the edge portion of one flange of said member, and a brake flange portion cast about the edge portion of the other flange of said member, said member having a free yieldable portion between said web and flange portions.

4. A brake drum comprising an annular member substantially L-shaped in section, said member having an annular resilient portion at the junction of the flanges thereof, a web cast about the edge portion of one flange of said member and a brake flange cast about the edge portion of the other flange of said member.

CHARLES W. SINCLAIR.